United States Patent [19]

Cloninger

[11] Patent Number: 4,974,290
[45] Date of Patent: Dec. 4, 1990

[54] MECHANICAL LOIN KNIFE

[76] Inventor: Norman L. Cloninger, P.O. Box 29, Hwy. 704, Rescue, Va. 23424

[21] Appl. No.: 391,951

[22] Filed: Aug. 10, 1989

[51] Int. Cl.⁵ .......................... A22B 5/16; A22C 17/12
[52] U.S. Cl. ...................................... 17/1 R; 17/1 G; 17/52; 17/51; 17/21
[58] Field of Search .................... 17/1 R, 1 G, 52, 46, 17/21, 51, 50; 30/123.3, 272 A, 309, 312, 356; 83/662

[56] References Cited

U.S. PATENT DOCUMENTS

| | | | |
|---|---|---|---|
| 2,810,954 | 10/1957 | Clark | 30/123.3 |
| 2,962,752 | 12/1960 | Massengill | 17/1 G |
| 2,984,005 | 5/1961 | Evich | 17/1 G |
| 3,197,808 | 8/1965 | Mears | 17/1 G |
| 3,207,197 | 9/1965 | Wilcox | 146/203 |
| 3,352,011 | 11/1967 | Alexander et al. | 17/1 G |
| 3,513,544 | 5/1970 | Renger | 30/272 |
| 3,605,178 | 9/1971 | Hoffman | 17/1 G |
| 4,153,973 | 5/1979 | Hughes | 17/23 |
| 4,324,043 | 4/1982 | McCullough | 30/276 |
| 4,516,323 | 5/1985 | Bettcher | 17/1 G |
| 4,637,140 | 1/1987 | Bettcher | 17/1 G |
| 4,662,029 | 5/1987 | Helsene | 17/52 |

Primary Examiner—Willis Little
Attorney, Agent, or Firm—Wallace J. Nelson

[57] ABSTRACT

A mechanical loin knife for removing a pork loin from the belly, ribs and fatback portion of a pork carcass is disclosed. A sustantially U-shaped knife blade 28 is supported within an elongated track 26 and adapted to pull or separate the pork loin therefrom. A pair of handles 25,27 are disposed one on each end and in a 90° relationship with respect to elongated blade track 26. Blade 28 undergoes oscillating movement in response to an oscillating bar 49 connected thereto. Oscillating bar 49 is actuated by an oscillator cam 53 driven by a reduction gear output 48 leading from an overhead suspended electric motor 11. An overhead, house pressure, 180° F. water supply 32 is connected through conduit 29 to blade track 26 and distributes sanitizing water via a manifold 68 housed therein to the base of blade 28. The 180° F. water supply serves to maintain blade 28 clean and at an elevated temperature during use thereof.

15 Claims, 5 Drawing Sheets

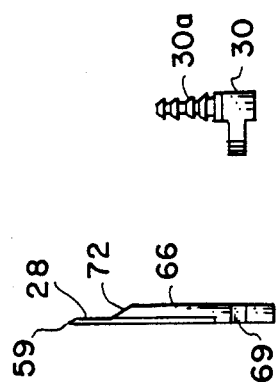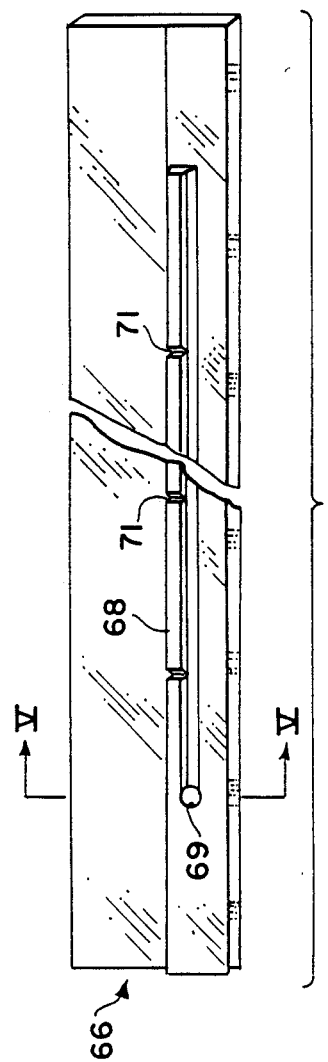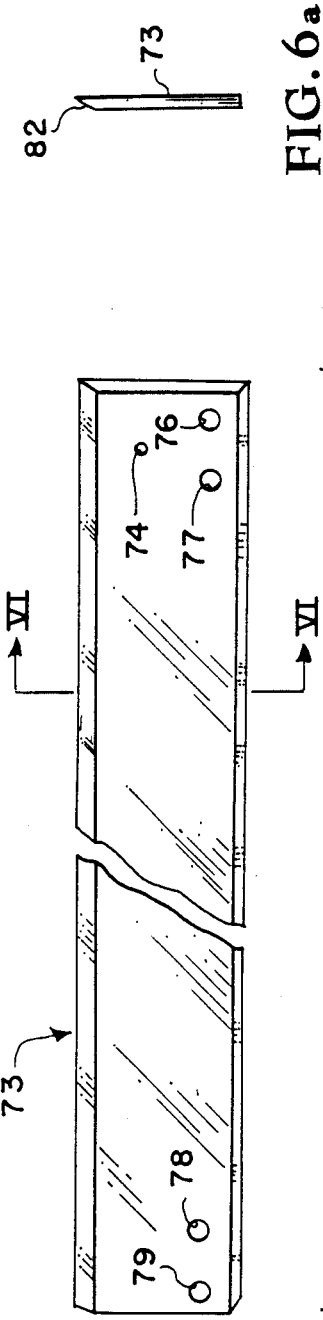

MECHANICAL LOIN KNIFE

FIELD OF THE INVENTION

This invention relates generally to the hog processing industry and relates in particular to an oscillating blade, loin pulling knife for removing a pork loin from the pork belly, ribs and fatback portion of a pork carcass.

BACKGROUND OF THE INVENTION

Conventional loin pulling in the hog processing industry involves a worker manually pulling a curved sharpened fixed blade, via a pair of handles attached 90° relative to the blade, through the cold pork carcass to separate the loin from the belly, ribs and fatback. After each pulling operation, the worker immerses the knife into a container of 180° F. water to effect cleaning and heating of the blade for another lin pull. This continual dipping or immersion of the knife into a common water bath tends to contaminate the water and defeat, or at best, make the sanitizing process questionable. The heated blade is soon chilled during the next loin pull and considerable force is required to pull the knife blade through the cold carcasses. In addition, the blades are easily dulled and must be sharpened frequently to maintain their efficiency. This labor intense procedure is one of the most difficult tasks in the hog processing procedure and results in high turnover in employment. Further, tendonitis is becoming increasingly prevalent among workers in the meat processing industry due to excess strain on the muscles in the forearm and wrist. One theory postulates that this is due to the time required to perform certain cuts along certain lines that exert the muscles and tendons to abnormal strains. If these manual force cutting operations could be assisted by mechanical aids, the prevalence of this problem should be reduced.

There is thus a definite need in the art for an improved loin pulling knife and process for separating pork loins from hog carcasses in the processing industry.

Accordingly, it is an object of the present invention to provide an improved mechanical loin pulling knife for use in the hog processing industry.

Another object of the present invention is to provide a loin pulling knife having an oscillating blade.

A further object of the present invention is to provide a system for maintaining a loin pulling knife at a continuous elevated temperature during use thereof.

An additional object of the present invention is a system for supplying a minute continuous source of sterile 180° F. water to a loin pulling knife during use thereof.

Another object of the present invention is a loin pulling knife assembly that eliminates the need for open sterilizer baths in the loin pulling area of a hog processing plant.

A further object of the present invention is an improved handle assembly for a loin pulling knife.

An additional object of the present invention is a loin pulling knife that operates quicker, more efficient, and with less manual effort than that presently used in the hog processing industry.

SUMMARY OF THE INVENTION

According to the present invention, the foregoing and additional objects are attained by providing a curved, substantially U-shaped, stainless steel blade having a base edge and a sharp edge with the base edge supported in a curved track. An oscillating mechanism is connected to the blade to provide oscillating movement thereto within the curved track. A sterile 180° F. water supply, under normal house pressure, is connected to a manifold carried within the blade track and serves to supply a continuous supply of 180° F. sterile water to the base of the blade during use thereof.

A pair of handles are attached to the end of the track and disposed 90° relative thereto for pulling and/or guiding the blade through a hog carcass for pulling the loin therefrom. The oscillating mechanism is supported within a stainless steel casing disposed adjacent, and connected to, one of the handles. The input to the oscillating mechanism is received from a flexible drive shaft leading from an overhead electric motor. The drive shaft is connected to a reduction gear box, also disposed within the stainless steel casing and, disposed between the flexible drive shaft and the oscillating mechanism. Suitable switch controls are provided on one of the handles to permit the operator to selectively control the operation of the electric motor driving the knife blade.

BRIEF DESCRIPTION OF THE DRAWINGS

A more complete appreciation of the invention and many of the attendant advantages thereof will be more readily apparent as the same becomes better understood in reference to the following detailed description when considered in reference to the accompanying drawings wherein:

FIG. 5 is a view of the blade track base showing the side thereof positioned against the base of the blade;

FIG. 5a is an end view of the blade track base shown in FIG. 5 and taken along line VI—VI thereof and with the blade positioned therein;

FIG. 5b is a view of the water inlet connected to the blade track base shown in FIG. 5;

FIG. 6 is a view of the blade track top section;

FIG. 6a is an end view of the blade track top shown in FIG. 6 and taken along line VI—VI thereof;

DETAILED DESCRIPTION OF THE INVENTION

Figure 1:
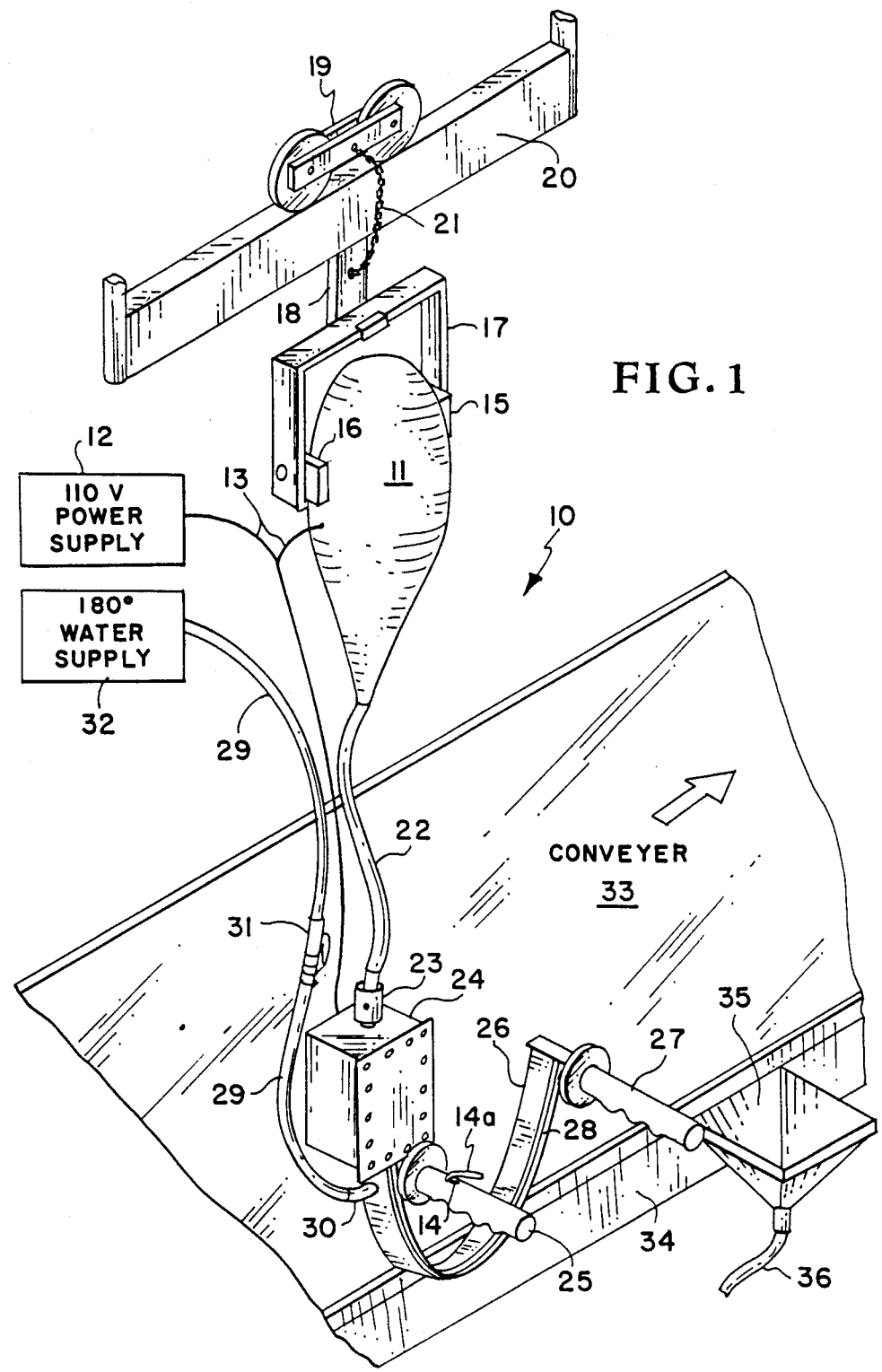
FIG. 1 is a part schematic representation of the mechanical loin knife assembly of the present invention in operative position.

Referring now to the drawings, and more particularly to FIG. 1, there is shown the mechanical loin knife assembly in accordance with the present invention and designated generally by reference numeral 10. Mechanical loin knife assembly 10 includes an electric motor 11 connected to a suitable 110 v power supply 12 through electric lead 13 and an on-off switch 14, actuated by a pivot lever 14a, as will be further explained hereinafter. Electric motor 11 is pivotally connected via supports 15,16 to a gimble ring 17.

A vertical bracket 18 serves to attach gimble ring 17 to a two wheeled trolly 19 that rides on an overhead beam 20. A safety chain 21 extends through vertical bracket 18, trolly 19, and around beam 20 to secure motor 11 against falling in the event trolly 19 accidently falls off beam 20. A flexible cable 22 leads from electric motor 11 to coupling sleeve 13 provided on a stainless steel casing 24.

Stainless steel casing 24 is connected to a handle 25 that supports one end of a substantially U-shaped blade track 26. Another handle 27 is secured to the other end of blade track 26. An oscillating blade 28 is slidably maintained within U-shaped blade track 26 and connected at one end to an oscillating device extending from stainless steel casing 24, as will be further explained hereinafter.

A hot water conduit 29 is attached to a connection 30 at one end of blade track 26. A quick disconnect coupling and valve 31 is disposed within conduit 29 adjacent stainless steel casing 24. Hot water conduit 29 is constructed of a high temperature resistant sanitary hose and extends from an overhead 180° F. water supply, schematically shown and designated by reference numeral 32. The depending knife assembly extends adjacent a movable conveyor belt 33 disposed on a cutting table 34. Conveyor belt 33 serves to move the hog carcass portions into position for loin pulling and to remove the separated sections after a loin is separated from the belly by the knife assembly.

A suitable flush basin 35 leading to drain 36 is provided on the side of table 34 to permit flushing of oscillating knife blade 28 and blade track 26 after each cutting operation, as will be further explained hereinafter. Conveyor belt 33 moves parallel to overhead beam 20 and trolly 19 may be moved along this parallel path, as so desired. When it is desired to maintain trolly 19 in a fixed position, suitable C-clamps may be attached to beam 20 on opposite sides of trolly 19 to prevent the wheels thereof from movement.

A suitable commercially available electric motor for use in practice of the present invention is the Bettcher Model No. ²1200 Whizzard Knife motor designed for driving rotating knife blades. This motor drives the compatible Bettcher flexible rotating inner drive shaft housed within flexible cable 22, as will be further explained hereinafter.

Figure 2:
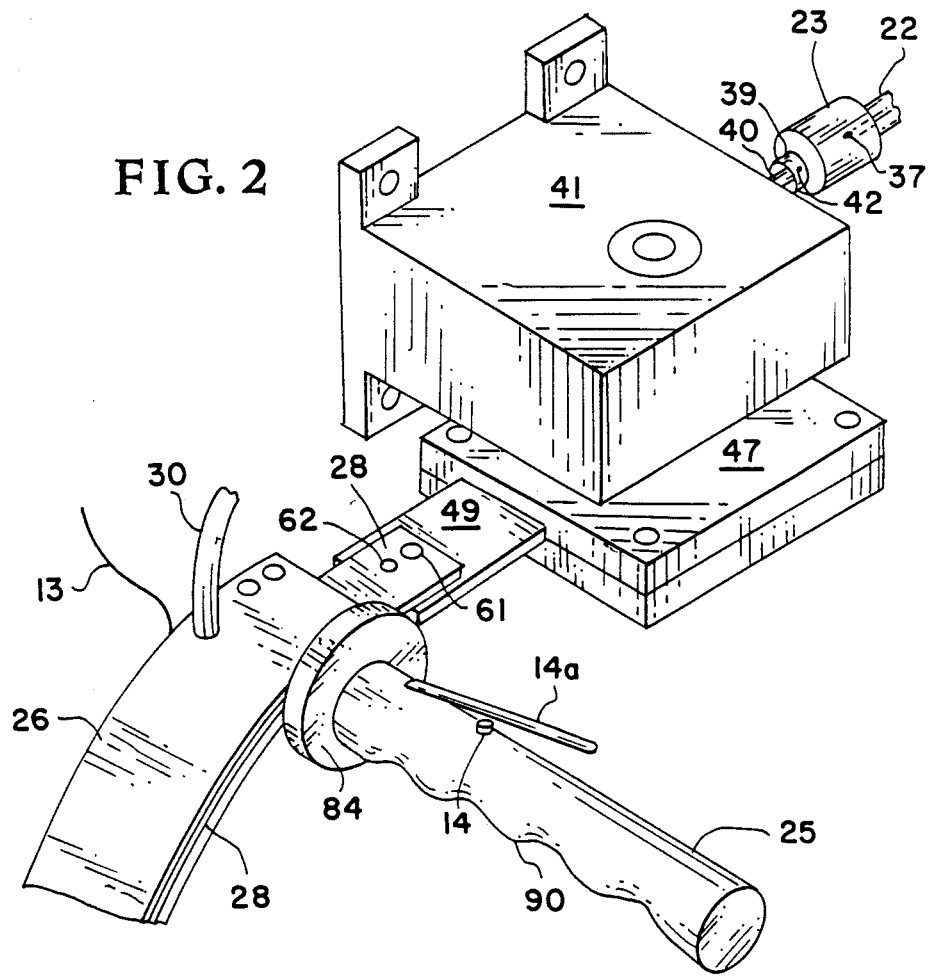
FIG. 2 is an enlarged view of the reduction gear box and conversion coupling employed in the mechanical loin knife assembly shown in FIG. 1, with the stainless steel casing omitted for the purpose of better illustrating the oscillating mechanism connected to the knife blade.
Figure 3:
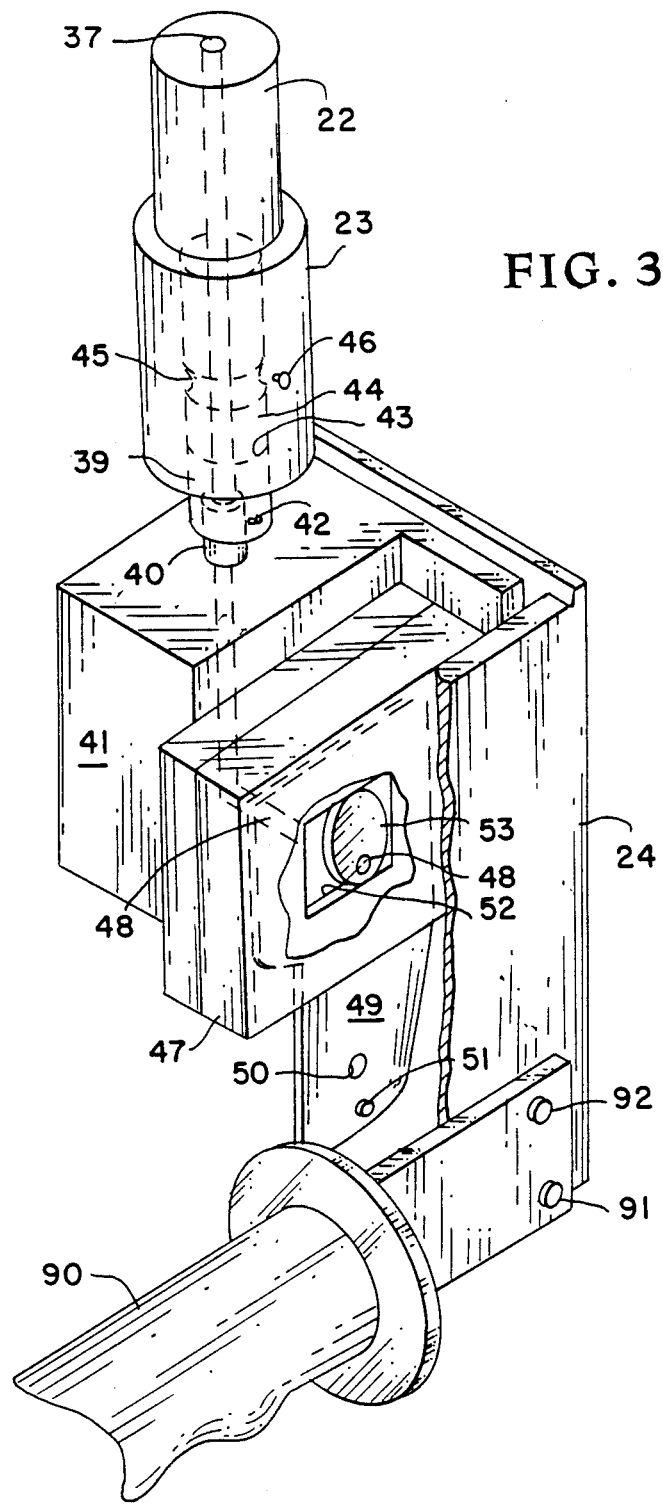
FIG. 3 is an enlarged view showing similar components as that shown in FIG. 2 but looking in a different direction and having parts therein omitted and/or broken away to better illustrate the oscillating mechanism.

Referring now more particularly to FIGS. 2 and 3, wherein stainless steel casing 24 is completely and partially omitted, respectively, the square end of inner drive shaft 37 extends through flexible outer cable 22 and is attached within one end of a coupling sleeve 23 via a transverse nylon set screw 46. Flexible cable 22 is provided with a rigid metal tip section 44 at the end thereof adapted to be inserted into coupling sleeve 23. A circumferential groove 45 is machined around the tip section 44 and serves to receive a nylon set screw 46. Nylon set screw 46 is inserted through a tapped opening (not designated) in coupling sleeve 23 to provide a rotatable connection for these components. Coupling sleeve 23 is freely rotatable about a coupling element 39 conventionally attached thereto and extending through one end thereof.

Coupling element 39 is provided with a square cross-sectional area opening 43 at one end thereof to receive the square end of inner drive shaft 37. Since the inner drive shaft 37 is being rotated in the same direction as motor drive 11, once the flexible cable 22 is bent (as under normal operation), inner drive shaft 37 exerts a force on the inside of outer flexible cable 22 at the crest of the bend. This causes the outer flexible cable 22 to tend to rotate at random in a direction opposite to that of the motor 11. Restricting this motor could cause the flexible cable 22 to "kink" during operation resulting in potentially serious harm to man and machine. By permitting coupling sleeve 23 to freely rotate relative to coupling element element 39, flexible cable 22 is allowed to rotate randomly while still keeping the square end of inner drive shaft 37 securely within opening 43 of coupling element 39.

Coupling element 39 is rigidly affixed, via a set screw 42, to a circular cross-sectional area input shaft 40 leading into a commercially available PIC reduction gear box 41. The PIC design reduction gear assembly is available from Precision Industrial Components, Corp., P.O. Box 1004, Benson Road, Middlebury, CT 06762. These reduction gear assemblies are available in ratios of 3:1; 2:1 and 1:1. In the embodiment of the present invention described herein the 2:1 reduction was employed to reduce the 3450 rpm of drive shaft 37 to an output of 1725 rpm for the output shaft driving the oscillator device.

An oscillator housing 47 is secured adjacent reduction gear box 41 and receives output shaft 48 therein. Output shaft 48 is disposed 90° relative to input shaft 40 and extends into the two part housing 47 that supports an oscillator bar 49 therein. Oscillator bar 49 has a first end extending from housing 47 and is provided with a tapped opening 50 and a transverse extension pin 51 disposed in linear spaced adjacency thereto. Opening 50 and transverse pin 51 serve to attach oscillator bar 49 to blade 28 as will be further explained hereinafter. A second end of oscillator bar 49 is provided with a rectangular opening 52.

A circular cam wheel 53, having an off-center opening therein, is secured to output shaft 48 for rotation therewith via a suitable set screw (not shown) and is positioned within rectangular opening 52. Cam wheel 53 has an outside diameter essentially equal to the width of rectangular opening 52 and the rotation of cam wheel 53 causes oscillator bar 49 to oscillate, in an up and down motion as shown in FIG. 3, due to the off-center connection of cam wheel 53 on output shaft 48. The interior surface of rectangular opening 52 is heat treated to prolong the life thereof due to the constant contact therein of rotating cam 53. A suitable grease fitting (not shown) is provided through stainless steel casing 24 and extending into oscillator housing 47 to permit lubrication of the oscillator components, as needed for preventative maintenance, without disassembly of components.

Figure 4:
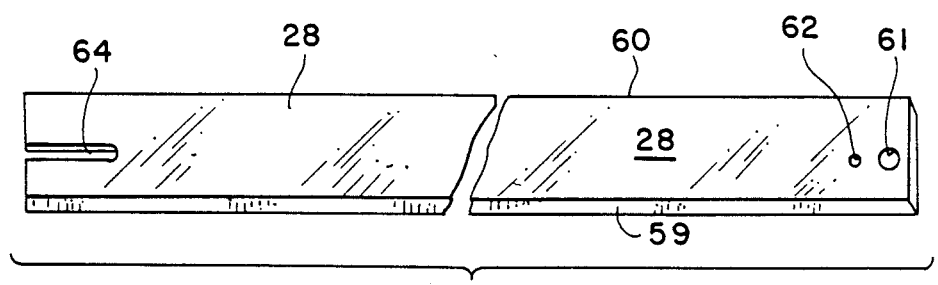
FIG. 4 is a view of an exemplary stainless steel cutting blade employed in the present invention.

Referring now more particularly to FIG. 4 a stainless steel blade 28, provided with a sharp edge 59, a flat edge base 60, and a pair of linearly spaced openings 61,62 at one end thereof, is adapted for attachement to oscillator bar 49. Openings 61,62 are provided along substantially the intermediate width of blade 28. Opening 62 receives extension pin 51 to thereby align opening 61 of blade 28 with tapped opening 50 on oscillator bar 49. A threaded bolt (not illustrated) is then positioned through opening 61 and tightened within tapped opening 50 in oscillator device 49 to positively connect blade 28 thereto. The opposite end of blade 28 is provided with an open linear groove 64 along a portion of the intermediate width thereof, as will be further explained hereinafter.

Referring now to FIGS. 5, 5a and 5b, the base section for blade track 26 is shown and designated generally by reference numeral 66. Blade track base 66 is provided with a linearly disposed water manifold 68 on the interior surface thereof that will be in contact with the base of blade 28. A tapped opening 69 extends transversely through blade track base 66 (FIG. 5a) and serves to connect manifold 68 with connection 30 leading to water hose 29. Connection 30 is provided with an inlet having a ribbed surface 30a to facilitate connection of hose 29 thereto. Manifold 68 is provided with a plurality of spaced openings 71 along the length thereof to distribute the 180° F. sterile water from water hose 29 to the base of blade 28. The top edge of blade track base 66 is provided with an approximately 60° beveled edge 72 directed away from the sharp edge 59 of blade 40.

Referring now to FIGS. 6 and 6a, the blade track top 73 forming part of blade track 26 is shown. Blade track top 73 is provided with a transverse bore 74 adjacent one end thereof. A pin member (not shown) is welded or otherwise permanently attached through bore 74. This pin member is of sufficient length to engage base section 66 of blade track 26 and is received by groove 64 of blade 28 to serve as a guide for blade 28 during oscillating movement thereof within blade track 26.

A pair of drilled and tapped bores are provided adjacent the bottom edge at each end of blade track top 73, as designated by reference numerals 76,77 and 78,79. These bores serve to connect handles 25,27 to blade track 26, as will be further explained hereinafter. The top edge surface of blade track top 73 is also provided with an approximately 60° beveled edge 82 directed away from the sharp edge 59 of blade 28 when assembled.

In the preferred embodiment, stainless steel blade 28 has a height of one inch, a length of approximately eighteen and one-half inches and a thickness of one thirty-seconds inch. Groove 64 is approximately three-fourths inch long and has a width of five thirty-seconds inch. Blade track base 66 is also formed of stainless steel stock and is approximately eighteen and three-fourths inches long, one and three-eights inches in height and one-eighth inch thick. Manifold 68 is spaced five-sixteenths inch from the bottom edge of base section 66 and is approximately sixteen inches long. The end of manifold 68 having tapped opening 69 therein terminates approximately one and one-half inches short of the end of base section 66. The other end of manifold 68 terminates approximately one and one-fourth inches from the other end of base section 66. The spaced openings 71 in manifold 68 are disposed approximately one and one-half inches from each other. Stainless steel blade track top 73 is also approximately eighteen and three-quarter inches in length, one and three-eights inches wide and has a thickness of one-sixteenth inch.

Blade track base 66 and blade track top 73 are machined, drilled and beveled or sharpened, to provide edges 72 and 82, prior to bending to the proper curvature shown in FIG. 1. Once bent, base 66 and top 73 are spot welded on one inch centers followed by heli-arc seam welding, grinding and polishing. Paired openings 76,77 and 78,79 are then bored and tapped through the assembled blade track 26 for mounting of handles 25,27. Openings 76 and 79 are disposed one-quarter inch from the bottom edge of track top 73 and one-quarter and three-sixteenths inch, respectively, from the end thereof. Bores 77 and 78 are located the same one-quarter inch from the bottom edge of track top 73 and one-half inch from respective bores 76,79. Blade 28 may then be slidably positioned within assembled track 26 and is ready for connection to oscillator device 49.

Figure 7:
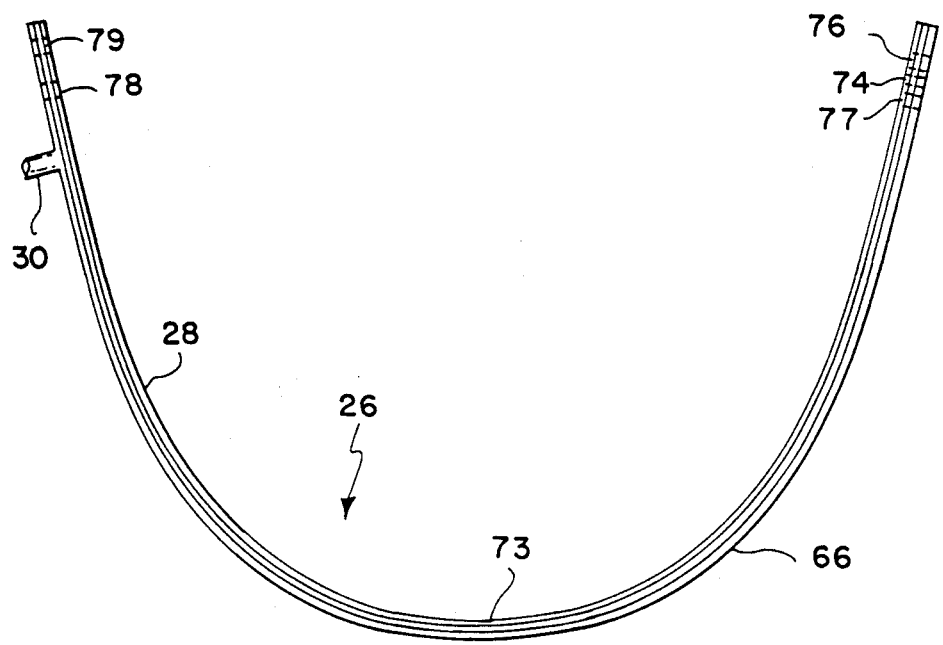
FIG. 7 is a view of the assembled blade and track components shown in FIGS. 4–6.

Referring now more particularly to FIG. 7, the assembled blade 28, track base 66 and track top 73 making up track 26 are shown. As shown therein, the blade track curvature for the portion thereof employed to pull the pork loin in the preferred embodiment, has a four and three-sixteenths inch outside diameter radius and a four inch inside diameter radius. The four, three-sixteenth inch diameter, handle bores 76,77 and 78,79 and the bore 74, for receiving the pin for slot or groove 64, are all bored through base track section 66 and track top 73 after assembly thereof.

Figure 8:
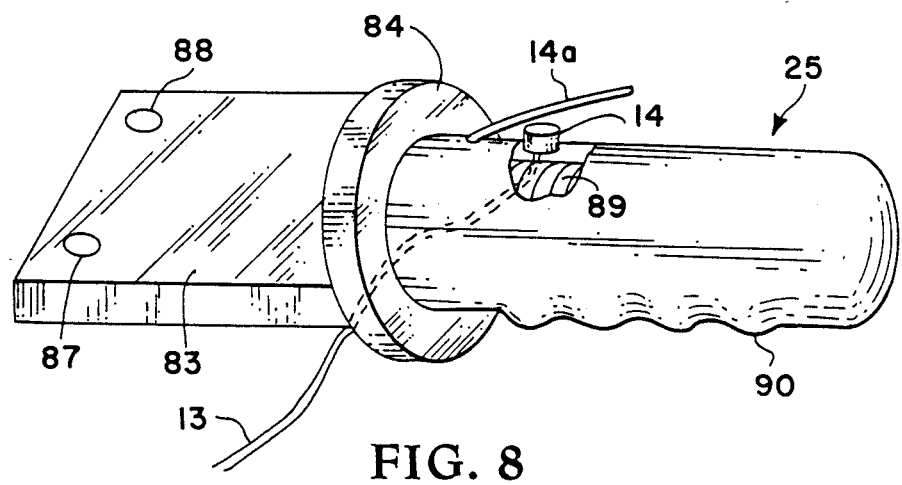
FIG. 8 is an enlarged view of one of the knife handles.

Referring now to FIG. 8, the details of handle 25 will now be described. Handle 25 is provided with a flat plate extension 83 extending from a circular shoulder 84. A pair of spaced bores 87,88 are provided through plate 83 and serve to receive bolts 91,92 (FIG. 3) for connecting handle 25, through bores 78 and 79, to blade track 42 and for attachment to stainless steel casing 24. Handle 25 includes a serrated hollow support 89 for frictionally receiving hand grip 90 thereon. Electric lead wire 13 extends into serrated support 89 to connect with on-off switch 14. Switch 14 is a conventional push button switch actuated by pivot lever 14a when handle 25 is gripped by an operator, and extends through hand grip 90 for electrical connection, via lead 13, with electric power supply 12 and electric motor 11.

The details of handle 27 are not described in the interest of brevity, it being understood that handle 27 also includes a flat plate connected through bores 76,77 to blade track 42. Handle 27, however, does not contain the connection to the stainless steel casing or the electric switch and electric lead line 13 of handle 25.

The operation of the invention is believed apparent from the above description. Referring back to FIG. 1, the loin knife assembly 10 is supported over a conveyor belt 33 carrying hog carcass portions that need to have the loin removed therefrom. These hog carcass portions include the pork belly, ribs and fatback wherein a scribe line has been previously cut through the ribs. Water conduit 29, flexible outside cable 22 and electric lead wire 13 are attached together to serve as an umbical connection for knife blade 28 and track 26. Knife 28 is able to move in an arc relative to motor 11 and the height of motor 11 is adjusted such that this umbical connection ensures that cable 22 is taut at the furthest point of knife blade 28 from motor 11 during a loin extracting or pulling procedure. When in position, valve 31 in conduit 29 is actuated to begin the minute flow of 180° F. sterile water, through manifold 68 onto the back and consequently, over the sides of, blade 28.

Switch 14 is actuated by gripping pivot handle 14a to begin blade oscillation and the operator guides blade 28 through the hog carcass by pulling on handles 25,27. Very little manual effort is required due to the rapid cutting effect of the hot, oscillating blade. The sterile 180° F. water supply flowing through conduit 29, from house pressure hot water supply 32, eliminates the need for dipping of the blade after each cut and accelerates the hog processing operation. After each loin pulling procedure, blade 28 and blade track 26 are flushed through the continuous water supply with the flushing water being received by flush basin 35.

For replacement of blade 28, for other repairs, or in the event of an emergency, manual disconnection of the knife assembly from the umbical support is accomplished by (1) loosening nylon screw 46, (2) disconnecting the electric supply by a suitable plug (not shown), (3) disconnecting the hot water supply at valve coupling 31 and removing the knife assembly. Daily disconnection would be expected for cleaning blade 28, inspection of the components and/or changing and lubrication of the movable blade parts.

To resume operation, these disconnected devices are again connected and knife assembly 10 is ready for use again. The taut connection of the umbical attachment for knife 28 prevents the operator from having to support the weight of the knife unit at any time except while it is in a cutting mode. Even then, the oscillating blade movement minimizes the weight factor. Also, the maximum weight for knife assembly 10 that need be supported by an operator is only a few pounds.

The material employed in constructing the gear box, oscillating system components, and the various bolts and other connecting devices employed in the preferred embodiment described herein, was primarily stainless steel, although other conventional materials that meet USDA standards for the meat processing industry, such as Teflon ®, composites, and the like, may be employed without departing from the teachings of the present invention.

There are obviously many variations and modifications in the present invention that will be readily apparent to those skilled in the art without departing from the spirit and scope of the appended claims. For example, the specific motor and drive shaft selected for use in the present invention are commercially available items and different motors and drive assemblies therefor would be expected to work equally as well. Although specific speeds have been mentioned for the electric drive shaft and oscillator device, these are not considered critical to the operation of the present invention and different speeds for these components would not necessarily hinder the operation of the invention.

Also, although the invention has been described as employing a single smooth surface cutting edge knife blade, it is not so limited and it is contemplated that single or multiple serrated blades may be used with the single oscillating device described herein or with a separate oscillating device for each blade employed. These and other variations and modifications of the present invention are considered within the scope of the present invention.

It is therefore to be understood that the invention may be practiced other than as specifically described herein.

What is claimed as new and desired to be secured by Letters Patent of the United States is:

1. A mechanical loin knife for removing a pork loin from the pork belly, ribs and fatback portion of a pork carcass having a scribe line previously cut through the ribs thereof, comprising:
   a curved substantially U-shaped blade adapted to extend through the scribe line and beneath the loin portion of the pork carcass,
   a curved substantially U-shaped blade track having a blade receiving groove therein for supporting said blade,
   a pair of handles disposed one on each end and in a substantially 90° relationship with said blade track,
   means attached to said blade track for mechanically producing oscillating motion to said blade, and
   means received by said blade track for maintaining said blade at an elevated temperature during use.

2. A mechanical loin knife for removing a pork loin from the pork belly, ribs and fatback portion of a pork carcass having a scribe line previously cut through the ribs thereof, comprising:
   a curved substantially U-shaped blade adapted to extend through the scribe line and beneath the loin portion of the pork carcass,
   a pair of handles disposed one on each end and in a substantially 90° relationship with said blade,
   means for maintaining said blade at an elevated temperature during use,
   said means for mechanically producing oscillating motion to said blade including an electric motor,
   a flexible drive cable driven by said motor,
   said flexible drive cable having a square ended flexible rotating inner shaft,
   a reduction gear box having a coupling thereon connected to said inner shaft and serving to reduce the input from said inner shaft to a reduced rotative output,
   an oscillating mechanism connected to said reduced rotative output and serving to change the rotative output to an oscillating motion,
   said oscillating mechanism being connected to said blade,
   said oscillating mechanism including a circular cam, said circular cam having an off-center opening therein received by and attached to said reduced rotative output of said reduction gear box, an oscillator bar disposed within said housing, and having a rectangular opening therein, said circular cam being disposed within and engaging the side surfaces of said rectangular opening of said oscillator bar, and said blade having one end thereof connected to and movable with said oscillating bar, whereby, as said circular cam rotates within said rectangular opening of said oscillating bar, said oscillating bar and the attached blade undergo oscillating movement.

3. The mechanical loin knife of claim 2 wherein said blade is provided with a pair of spaced openings therethrough on the end connected to and movable with said oscillating bar, a pin member integral with and projecting from a surface on said oscillating bar, said pin member being received by one of said spaced openings provided in said blade and a screw member positioned through the other of said openings in said blade and threadingly received in a tapped opening provided in said oscillating bar.

4. The mechanical loin knife of claim 3 including a curved substantially U-shaped blade track housing said blade, said track having a first end connected to said oscillating mechanism housing adjacent one of said handles, and a second end connected to the other of said handles, said second end of said blade track provided with a transverse pin extending transversely therethrough and said blade having a slotted end received by said transverse pin and wherein said transverse pin serves as a guide for said blade during oscillating movement thereof.

5. A mechanical loin knife for removing a pork loin from the pork belly, ribs and fatback portion of a pork carcass having a scribe line previously cut through the ribs thereof, comprising:

a curved substantially U-shaped blade adapted to extend through the scribe line and beneath the loin portion of the pork carcass, a pair of handles disposed one on each end and in a substantially 90° relationship with said blade, means for mechanically producing oscillating motion to said blade, means for maintaining said blade at an elevated temperature during use, said blade being provide with a sharp cutting edge, a pair of flat substantially parallel sides, and a relatively flat base edge joining said flat sides, a blade track for said blade, said blade track permitting oscillating movement of said blade relative thereto while maintaining said pair of sides and said relatively flat base edge of said blade covered and leaving the said sharp cutting edge of said blade exposed, said blade track being connected at opposite ends thereof to said pair of handles, said means for maintaining said blade at an elevated temperature during use including a hot water source connected to said blade track and serving to supply a constant supply of hot water to said blade during use thereof to maintain said blade at an elevated temperature, an elongated hot water manifold contained within said blade track, a plurality of spaced orifices in said manifold and adjacent to said blade, a hot water inlet connecting said manifold to said hot water source, said hot water source supplying water at substantially 180° F. to said manifold whereby, said hot water received and distributed by said manifold maintains said blade track and said blade constantly exposed to sterile water and maintains said blade at an elevated temperature during use thereof.

6. A mechanical loin knife for removing a pork loin from the pork belly, ribs and fatback portion of a pork carcass having a scribe line previously cut through the ribs thereof, comprising:

a curved substantially U-shaped blade adapted to extend through the scribe line and beneath the loin portion of the pork carcass, a pair of handles disposed one on each end and in a substantially 90° relationship with said blade, means for mechanically producing oscillating motion to said blade including an electric motor, means for maintaining said blade at an elevated temperature during use, said means for maintaining said blade at an elevated temperature during use including a blade track supporting said blade, a source of hot water connected to said blade track, and manifold means within said blade track for distributing hot water received from said source of hot water over said blade to maintain said blade and said blade track sterile, clean and at an elevated temperature during use thereof.

7. A mechanical loin pulling knife for separating pork loins from a hog carcass comprising, in combination:

an electric drive motor, said electric drive motor being connected to a power source, and disposed overhead of a cutting table, a flexible drive cable having a square flexible rotating inner shaft depending from said electric motor, said flexible rotating shaft having an end thereof provided with a square cross-sectional area, a gear box coupled to said square end of said flexible rotating inner shaft, said gear box serving to reduce the speed and increase the torque output from said rotating inner shaft, an oscillating mechanism affixed to and receiving the reduced speed and increased torque output from said gear box, a loin knife blade connected to said oscillating mechanism, a blade track having a blade receiving groove therein for supporting said loin knife blade during oscillating movement thereof, a 180° F. sterile water supply in fluid communication with said blade track groove and serving to continuously supply hot water to said blade from the inside of said blade track during blade use, and handle means attached to said blade track to guide said blade during a loin pulling operation.

8. The mechanical loin pulling knife of claim 7 wherein said handle means comprises a pair of handles disposed on opposite ends of said blade track, and said switch means being positioned on one of said handles for selectively activating and inactivating the power supply to said electric motor.

9. The mechanical loin pulling knife of claim 7 including said 180° F. sterile water supply includes a sterile water conduit extending from a sterile water source and leading to an inlet on said blade track, and including a valve cut-off and quick disconnect means being disposed in said conduit to selectively start and stop the flow of 180° F. water to said blade track.

10. The mechanical loin pulling knife of claim 9 including a sterile water receiving manifold in said blade track and a plurality of spaced openings in said manifold to permit sterile water received therein to be continuously expelled onto said blade and thereby continuously sterilize said blade and maintain said blade and said blade track at an elevated temperature during use thereof.

11. The mechanical loin pulling knife of claim 9 including said electric motor being pivotally attached to a wheeled trolly, said trolly being linearly movable along a support beam in parallel relationship to said cutting table, an electric power line leading from said motor to said switch means on one of said handles, said flexible drive cable, said sterile water conduit and said electric power line all being releasably connected to each other to extend as a unit to connect to the respective parts of said loin pulling knife.

12. A mechanical knife for use in processing animal carcasses comprising:

an elongated curved substantially U-shaped, bifurcated blade track, a pair of handles attached one at each end of said elongated blade track and in a substantially 90° relationship therewith.

a curved substantially U-shaped knife blade slidably disposed within said blade track, and means attached to one end of said knife blade for producing an oscillating motion to said blade.

13. A mechanical knife for use in processing animal carcasses comprising:

an elongated bifurcated blade track, a pair of handles attached one at each end of said elongated blade track, a knife blade slidably disposed within said blade track, means attached to said knife blade for producing an oscillating motion to said blade;

said means attached to said knife blade for producing an oscillating motion to said blade including an electric motor, a flexible drive shaft extending from said electric motor, a gear box having an input shaft and an output shaft, said input shaft of said gear box being releasably connected to and driven by said flexible drive shaft, and an oscillating mechanism attached to and driven by said output shaft;

said oscillating mechanism including a circular cam wheel having an off-center opening therein received by and attached to said output shaft, an oscillating bar having a first end provided with a rectangular opening therein, said rectangular opening being of substantially the same width as the diameter of said circular cam wheel and receiving said circular cam wheel, said oscillating bar having a second end attached to said knife blade, whereby as said output shaft rotates in response to said flexible drive shaft driving said input shaft, said cam wheel rotates in said rectangular opening and causes oscillation of said oscillating bar and said attached knife blade.

14. The mechanical knife of claim 13 wherein said blade track is of a curved substantially U-shaped configuration and said pair of handles are attached in a substantially 90° relationship thereto.

15. The mechanical knife of claim 13 including means for supplying hot water to said knife blade to maintain said blade at an elevated temperature during use thereof.

* * * * *